(No Model.)
C. F. GERIES.
TREE PROTECTOR.
No. 445,887. Patented Feb. 3, 1891.
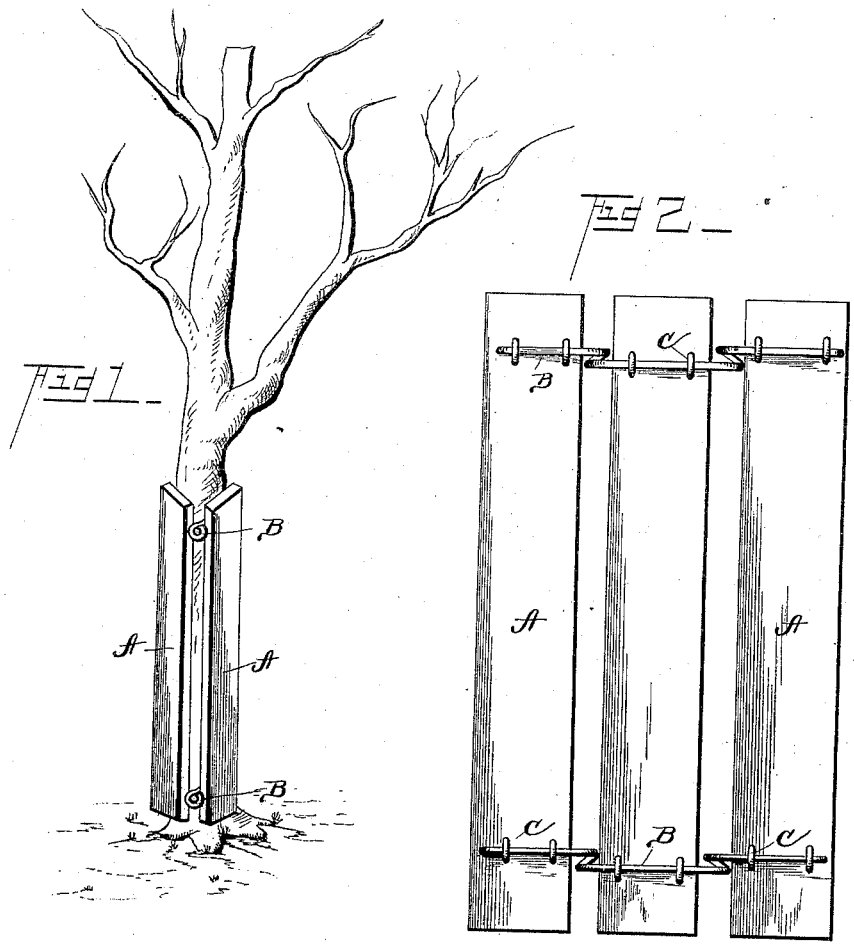
WITNESSES:
INVENTOR:

UNITED STATES PATENT OFFICE.

CHARLES FREDERICK GERIES, OF DUDLEYVILLE, ILLINOIS.

TREE-PROTECTOR.

SPECIFICATION forming part of Letters Patent No. 445,887, dated February 3, 1891.

Application filed July 29, 1890. Serial No. 360,264. (No model.)

*To all whom it may concern:*

Be it known that I, CHARLES FREDERICK GERIES, a citizen of the United States, and a resident of Dudleyville, in the county of Bond and State of Illinois, have invented certain new and useful Improvements in Tree-Protectors; and I do hereby declare that the following is a full, clear, and exact description of the invention, which will enable others skilled in the art to which it appertains to make and use the same, reference being had to the accompanying drawings, which form a part of this specification.

My invention has relation to tree-protectors.

The object of my invention is to protect trees and plants of various kinds from the ravages of rabbits, sheep, and other cattle, which, as is well known, when the tree is left unprotected, gnaw and in many cases destroy or kill the trees, thereby causing much loss to farmers and tree-growers.

Heretofore in this class of devices it has been found difficult to provide a convenient arrangement whereby adjustment to the tree can be accomplished in a simple and expeditious manner.

My invention consists in providing against the above-named disadvantages by producing a construction which cannot only be readily adjusted to the tree or plant, but at the same time may as readily be removed therefrom with but the slightest difficulty and trouble.

In the accompanying drawings, Figure 1 is a perspective view showing my device applied to a tree. Fig. 2 is a side elevation of the protector removed from the tree, and showing the same opened for adjustment thereto; and Fig. 3 is a detail view of one of the springs used in connection with my device.

Like letters of reference refer to like parts throughout the several views.

The invention is composed of a series of slats A, preferably three in number, which are held in proper position by means of spring-wires B B, arranged at the bottom and top of the slats and upon the inner sides thereof. These springs, it will be noticed from the detail view, approximate the form of a triangle, the apex thereof being open and the angles of the base coiled so as to increase the resiliency thereof. The slats upon their inner sides are provided with a series of staples C, through which the spring-wires are inserted. These springs, as stated, when in their normal position approximating the shape of a triangle, naturally impart a corresponding shape to the slats, thus forming a convenient opening for the trunk of the tree or plant.

I do not wish to be understood as confining myself to the particular shape or construction of the device herein shown and described, as it is obvious that any other form may be employed without departing from the spirit of my invention, the essential feature of which is a series of slats having spring-connections therebetween, so as to provide for insertion around the trunk of a tree.

The great advantage and utility of my invention cannot fail to be readily perceived. It not only possesses simplicity to the maximum degree, but, furthermore, can be constructed at but slight cost.

Another advantage consists in the fact that by having the series of slats connected in the manner pointed out the structure may be adjusted to trees of different sizes, as it is evident that the slats by reason of their peculiar connection will adapt themselves to trees or plants of varying sizes.

Having thus described my invention, what I claim, and desire to secure by Letters Patent of the United States, is—

In an adjustable tree-protector, the combination, with a plurality of slats provided upon their inner faces with staples, of spring-wires passing through said staples, each of said wires approximating the form of a triangle with its apex open and the angles of its base formed into loops, substantially as set forth.

In testimony that I claim the foregoing as my own I have hereunto affixed my signature in presence of two witnesses.

CHARLES FREDERICK GERIES.

Witnesses:
    E. RIEDEMANN,
    J. R. BROWN.